United States Patent
Mulder et al.

(10) Patent No.: US 6,212,411 B1
(45) Date of Patent: Apr. 3, 2001

(54) POWER SUPPLY CIRCUIT, TELECOMMUNICATION DEVICE AND METHOD FOR MULTIPLE DC SLOPE POWER MANAGEMENT

(75) Inventors: Jacob Mulder; Fransiscus J. M. Thus, both of Eindhoven (NL); Eric C. Labbe, Cornaredo (IT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/077,136

(22) PCT Filed: Sep. 26, 1997

(86) PCT No.: PCT/IB97/01175
  § 371 Date: May 21, 1998
  § 102(e) Date: May 21, 1998

(87) PCT Pub. No.: WO98/13999
  PCT Pub. Date: Apr. 2, 1998

(30) Foreign Application Priority Data

Sep. 26, 1996 (EP) .................................................. 96202692

(51) Int. Cl.$^7$ ....................................................... H04B 1/38
(52) U.S. Cl. .......................... 455/572; 455/299; 379/387; 379/413
(58) Field of Search .................................. 455/572, 299, 455/343, 127, 573, 574, 282; 379/387, 388, 413, 414, 21

(56) References Cited

U.S. PATENT DOCUMENTS

| | | | |
|---|---|---|---|
| 4,419,542 | * 12/1983 | Embree et al. | 379/377 |
| 4,488,006 | * 12/1984 | Essig et al. | 379/387 |
| 4,532,381 | * 7/1985 | Rosenbaum et al. | 379/345 |
| 4,748,664 | * 5/1988 | Blomley | 379/395 |
| 5,222,119 | * 6/1993 | Asano | 379/2 |
| 5,323,461 | * 6/1994 | Rosenbaum et al. | 379/399 |
| 5,343,514 | * 8/1994 | Snyder | 379/93.01 |
| 5,502,760 | * 3/1996 | Gilbert et al. | 379/93.05 |
| 5,627,890 | * 5/1997 | Gay | 379/399 |
| 5,712,554 | * 1/1998 | Lace | 323/259 |
| 5,771,285 | * 6/1998 | Wittman | 379/377 |

OTHER PUBLICATIONS

By Philips, "Application Note, Application of the Tea 1093 Handsfree Circuit ETT/AN93015" pp. 1–67.

* cited by examiner

Primary Examiner—Dwayne Bost
Assistant Examiner—Sonny Trinh

(57) ABSTRACT

A power supply circuit includes a line voltage forming circuit and a supply voltage forming circuit. The line voltage forming circuit forms a voltage that is proportional to a line voltage provided by a telecommunication line, and the supply voltage forming circuit forms a second voltage from the first voltage. A sensing circuit senses the telecommunication line and provides a sensor signal that is representative of the power provided by the telecommunication line. The line voltage forming circuit is controlled by the sensor signal such that the slope of a load line characteristic of the line voltage forming circuit is modified when the sensor signal is above a predetermined threshold signal. The load line characteristic defines an increase of the line voltage with an increase of the line current provided by the telecommunication line.

6 Claims, 5 Drawing Sheets

POWER SUPPLY CIRCUIT, TELECOMMUNICATION DEVICE AND METHOD FOR MULTIPLE DC SLOPE POWER MANAGEMENT

BACKGROUND OF THE INVENTION

1. Field of the Invention

The present invention relates to a power supply circuit comprising a line voltage forming circuit to be coupled to a telecommunication line having a line voltage for providing a supply voltage.

The present invention also relates to a telecommunication device comprising such a power supply circuit.

2. Description of the Related Art

Furthermore the present invention concerns a method for deriving a supply voltage from a telecommunication line voltage.

Such a power supply circuit, telecommunication device and method are being applied in telecommunication, in particular telephone ICs' wired or wireless subscriber telephones, a facsimile, a Web-television having a telephone card, a personal computer having a telephone card etc. These are known from Philips Semi-conductors Application Note AN 94069. The power supply IC described therein provides for facilities of a telephone subscriber set, such as handsfree facilities, listening-in facilities, dialling features, loudspeaker features etc. The stabilised power for these facilities is being supplied by and derived from the telecommunication line voltage. However the behaviour of the line power extracted from the telecommunication line is prescribed by the national telecommunication authorities, such as the PTT in the Netherlands. Within the line voltage versus line current characteristic the DC load line is precisely defined to lie in between forbidden area's. The growth of the features however, poses increasing demands on the maximum supply voltage which is necessary for these features to function optimally.

SUMMARY OF THE INVENTION

It is an object of the present invention to provide tools for optimum power management between, at the one hand what is allowed by the national telecommunication authorities and at the other hand what is required for the facilities to operate in their full working area.

Thereto the present invention is characterised in that the power supply circuit is provided with a sensing circuit having an input to be coupled with the telecommunication line, and an output for providing an output signal which is representative for the power taken from the telecommunication line, and that the line voltage stabiliser is provided with a stabilised facility supply voltage control input coupled with the output of the sensing circuit.

Thereto the method according to the invention is characterised in that a signal representing the power taken from the telecommunication line is being used to influence the line voltage and therewith the supply voltage.

It is an advantage of the present invention, that it provides the possibility to use the non-forbidden area to a fuller extend by providing measures to influence the lie of the load line, and in particular to position the load line as closely and as optimally as possible in the vicinity of what is prescribed to be the maximum reachable. By doing this the thus adjustable lie of the load point on the load line can be optimally adjusted to the requirements with respect to the stabilised facility supply voltage of the facilities.

According to one embodiment the power supply circuit according to the invention is characterised in that the sensing circuit is provided with a threshold means for controlling the voltage forming circuit such that its supply voltage is increased every time the power taken from the telecommunication line exceeds one or more thresholds.

Its an advantage of the embodiment of the power supply circuit according to the invention that a step-wise optimal adjustment can be effected in a relatively simple way.

BRIEF DESCRIPTION OF THE DRAWING

At present the invention will be elucidated further together with the other advantages under reference to the accompanying drawing, whereby corresponding parts in the different Figures are indicated by the same reference numerals. In the drawing.

DESCRIPTION OF THE PREFERRED EMBODIMENTS

Figure 1:
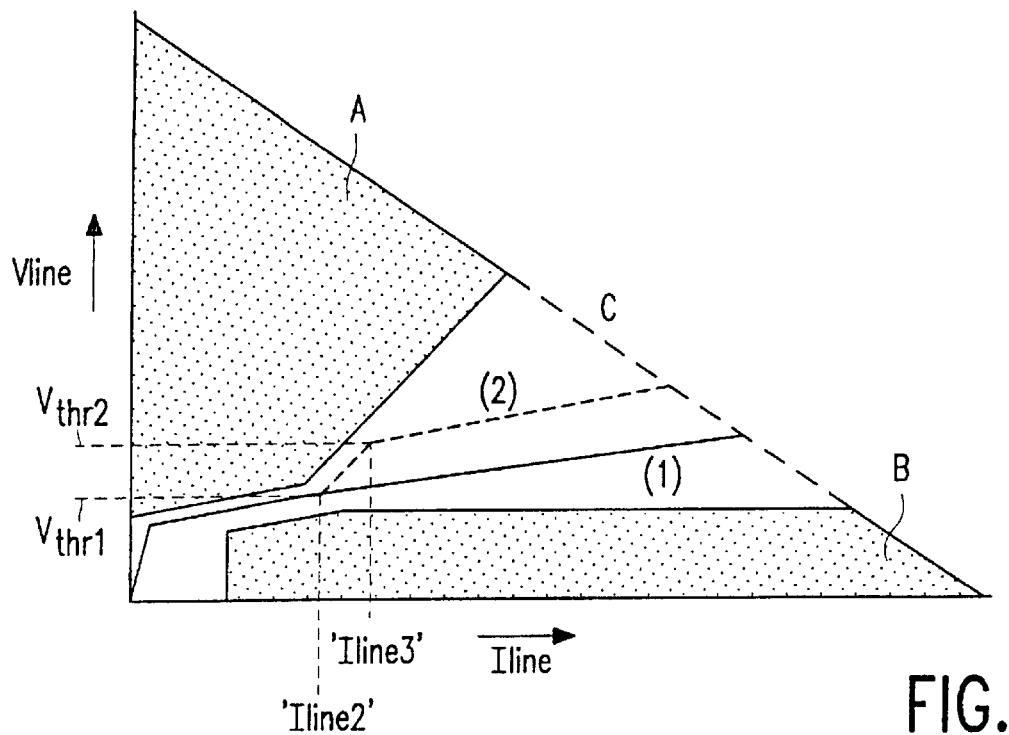
FIG. 1 shows a possible graph of the line voltage (Vline) versus the line current (Iline), wherein allowable load lines (1) and (2) are drawn.
Figure 2:
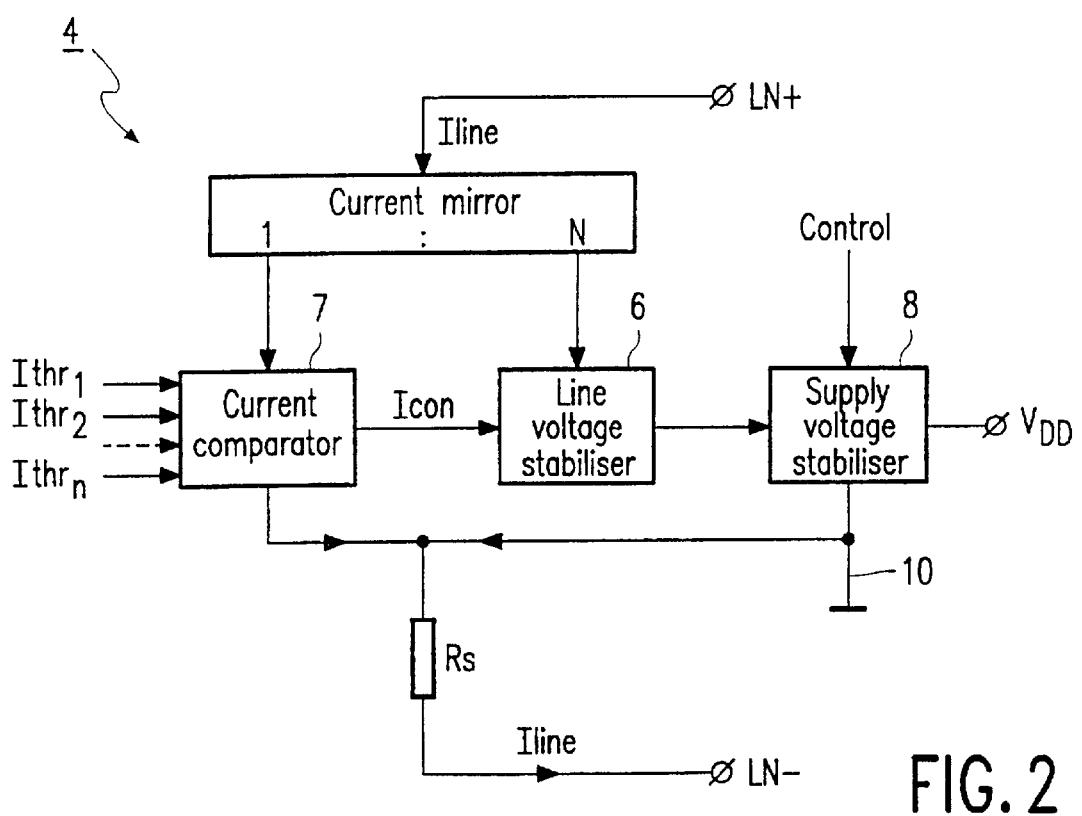
FIG. 2 shows one possible embodiment of the power supply circuit according to the invention.
Figure 5:
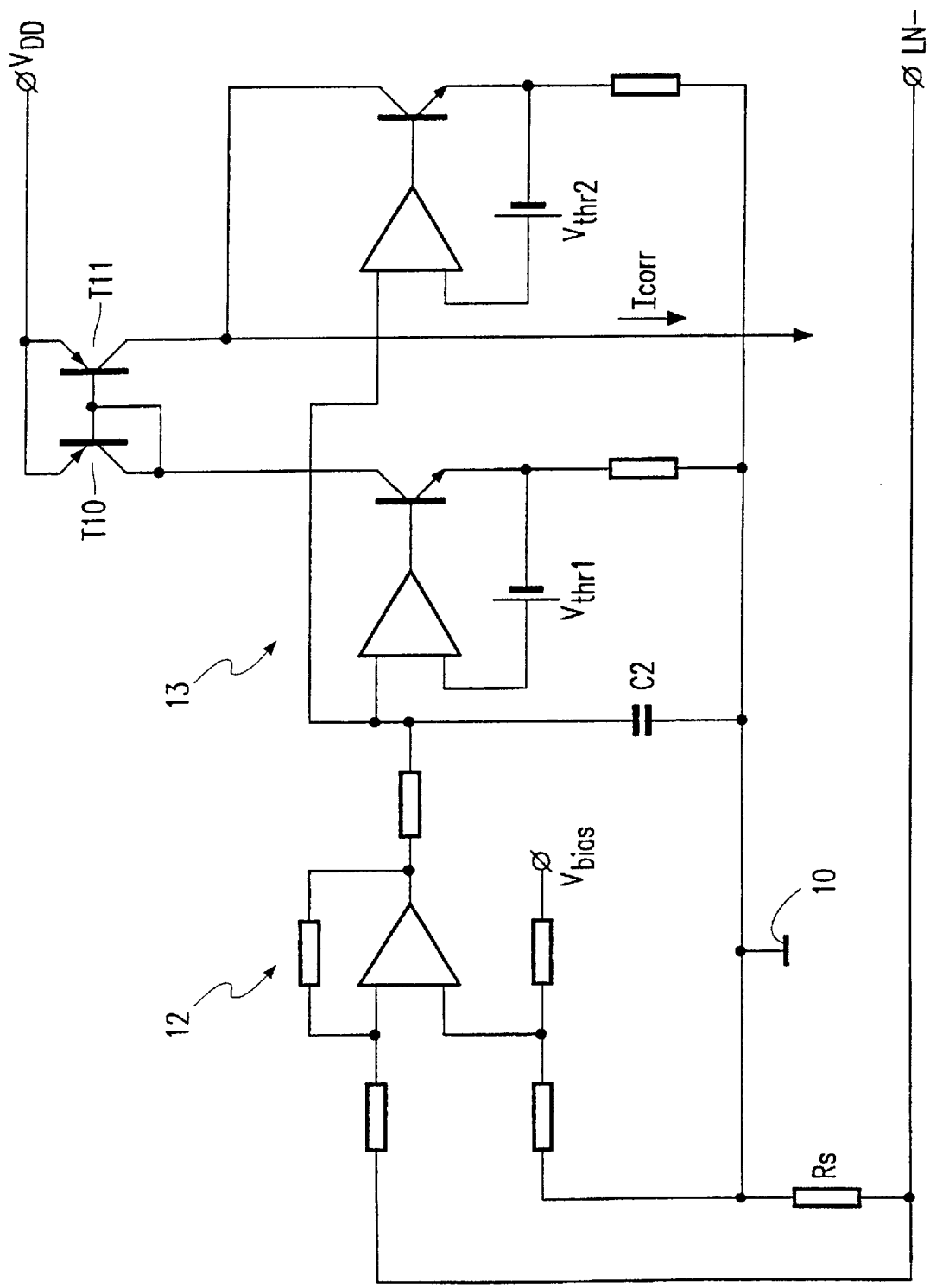
FIG. 5 shows a worked-out example of the embodiment of FIG. 3.
Figure 6:
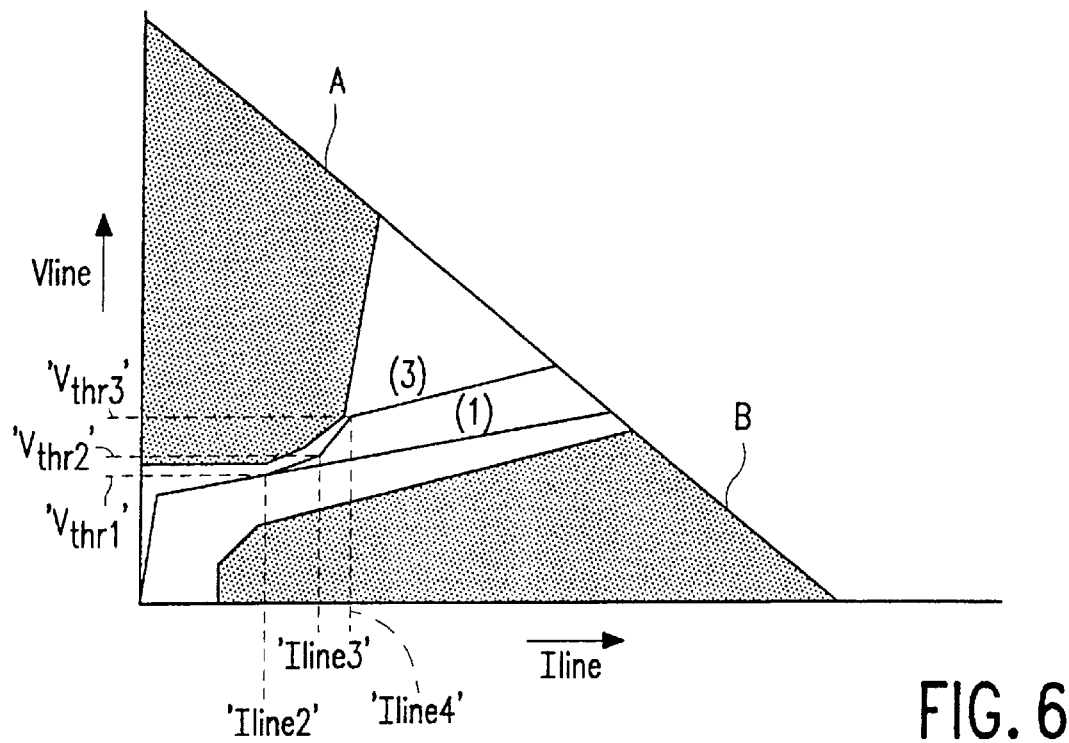
FIG. 6 shows a graph which is similar to the graph shown in FIG. 1.

FIG. 1 shows a graph indicating the line voltage (Vline) versus the line current (Iline) on a telecommunication line having terminals LN+ and LN− indicated in the FIGS. 2, 5. By the national telecommunication authorities area's indicated A and B are declared to be forbidden areas. Each national telecommunication authority may proclaim specific area's to be forbidden. FIG. 6 shows a graph similar to the graph of FIG. 1, which however applies to the United Kingdom. (1) is a load line known to be allowable. By means of a power supply circuit to be described, from Vline there is to be derived a stabilised facility supply voltage VDD which is always smaller than the line voltage wherefrom it is derived. The voltage VDD is used in for example a telephone subscriber set to power facilities, such as listening in, loudspeaker facilities etc. In order to optimise the operational voltage of these facilities the load line (1) is being influenced to create a tilted load line (2). An alternative multiple tilted load line (3) is shown in the graph of FIG. 6, in order to optimise VDD as much as possible within the limits of the forbidden area's A and B.

FIG. 2 shows schematically a possible embodiment of a power supply circuit 4. In this embodiment the power supply circuit 4 comprises a current mirror means 5. The main part of the line current from terminal LN+ is conveyed through a line voltage forming circuit 6, which can be a stabiliser, which stabilises the line voltage LN+. A small part of the line current from the current mirror means 5 is conveyed through a current comparator 7 which will be described later on. The mean part N of the line current is also conveyed through a supply voltage stabilizer 8 of the power supply circuit 4. The stabilizer 8 generates the stabilized facility supply voltage VDD, which is used to provide the facilities with the necessary power.

The operation of the FIG. 2 embodiment is such that as long as the line current remains under a value, which is related to Ithr1, load line (1) (see FIG. 1) will be followed. As soon as the line current exceeds a value whereby its mirrored current exceeds Ithr1 the load line (2) will be followed. At that stage a the correction current Icorr is generated in order to increase the line voltage LN+. Because the voltage VDD follows the line voltage LN+, VDD is increased too.

Figure 4:
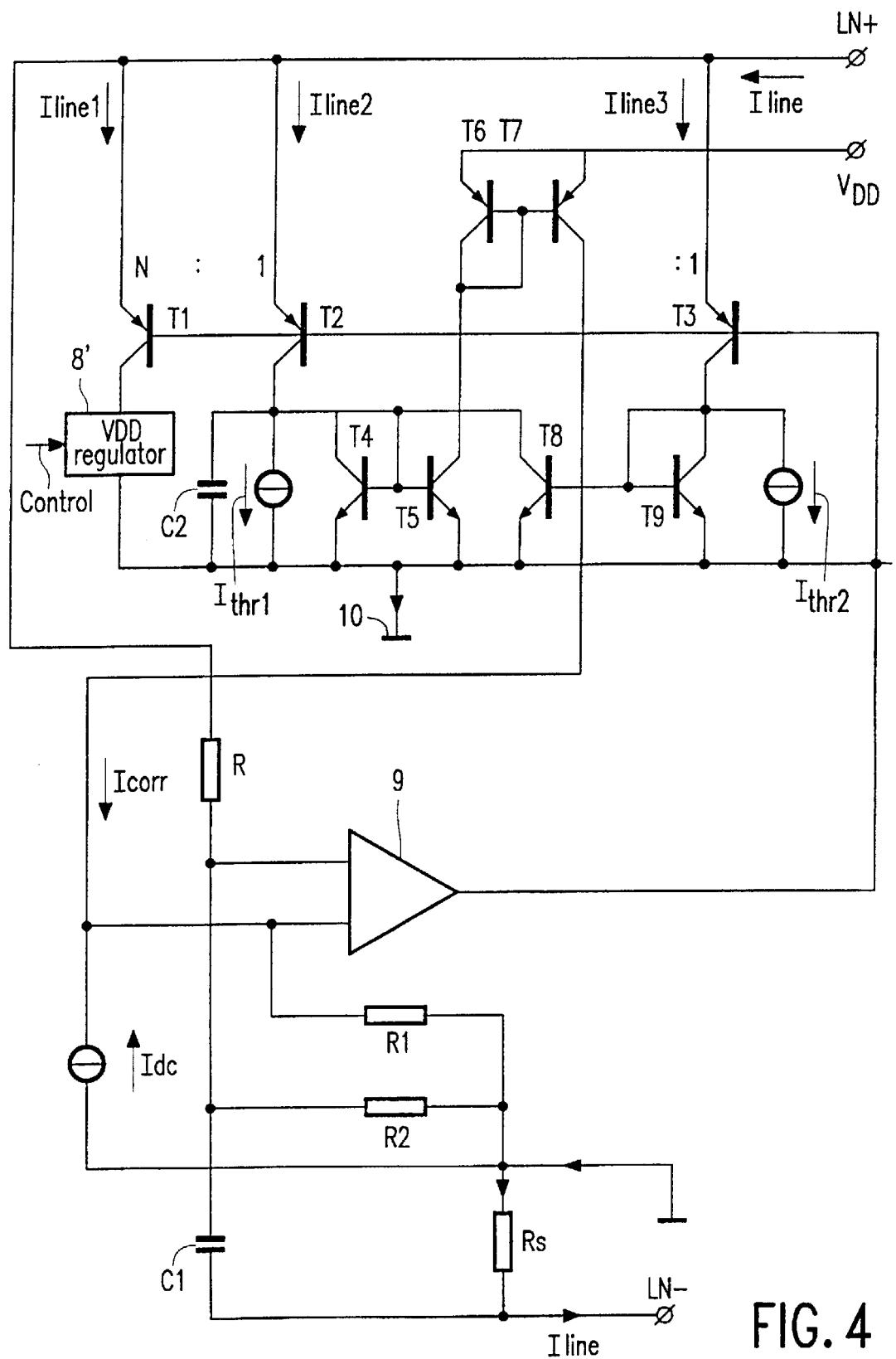
FIG. 4 shows a worked-out example of the embodiment of FIG. 2.

Again schematically, FIG. 4 details this operation. Transistor T1 in FIG. 4 conveys the main part (N) of the line current through a stabiliser part 8' of the supply voltage stabiliser 8. In fact the stabiliser part 8' stabilises the differences between the line voltage LN+ and the stabilised facility supply voltage VDD under command of an external control signal, not further described. If the 1/(N+2) part of Iline 1, which is Iline 2, after adequate filtering by C2, exceeds the current source current Ithr1 the exceeding part is lead through a current mirror T4, T5 and additionally through a further current mirror T6, T7. Finally a correcting current Icorr is generated, which is added to a current Idc of its current source, which by means of a differential amplifier 9 leads to an increase of the line voltage LN+ and thus to an increase of the supply voltage VDD. This gives rise to an increased positive slope of load line (2) in FIG. 1. A further increase of the line current such that its mirrored part Iline 3 exceeds the current Ithr2 leads to a negative correction on the correction current Icorr as a consequence of which the load line (2) is bent back parallel to the load line (1), but above this load line (1). This gives rise in this area to an increased line voltage and thus to an increase of the voltage VDD for optimising the power to the facilities.

Figure 3:
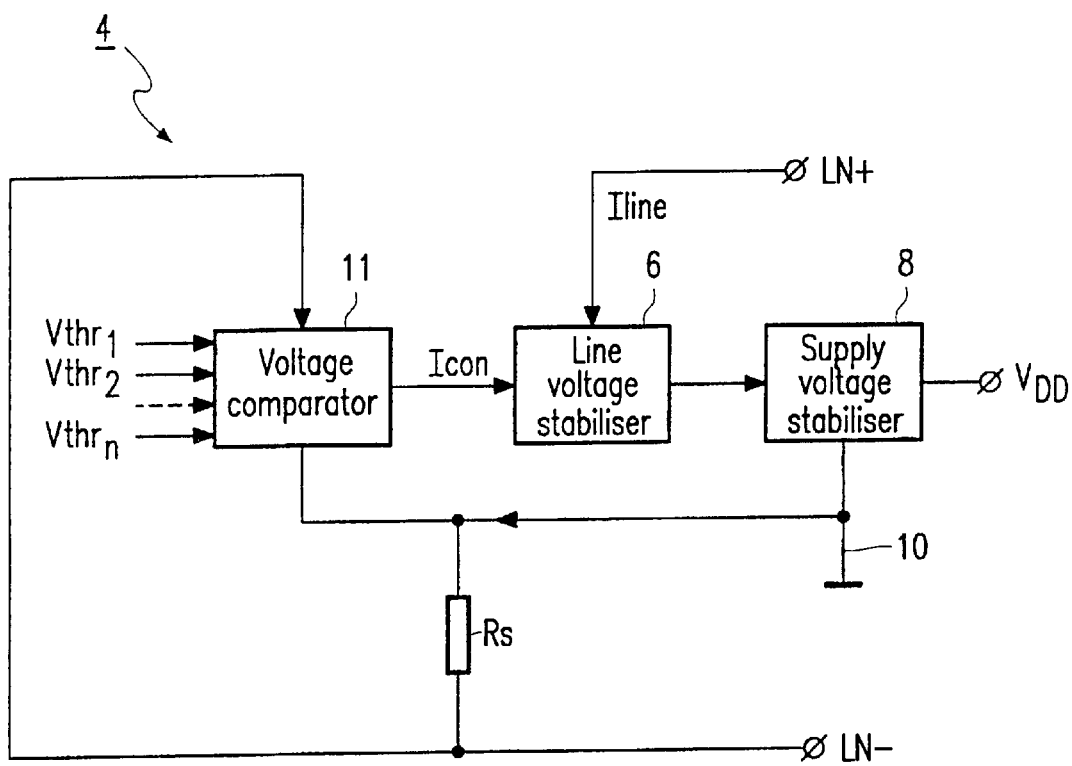
FIG. 3 shows an other embodiment of the power supply circuit according to the invention.

In a similar, though complementary way the further embodiment of FIG. 3 of the power supply circuit 4 shows how voltage sources can do a similar job in the voltage domain. The unknown line current Iline from terminal LN+ is lead through the line voltage stabiliser 6 and the externally controlled supply voltage stabiliser 8 via earth 10 through resistor Rs to line terminal LN−. The voltage across resistor Rs, which contains a measure for the line current is conveyed to a voltage comparator 11. The DC component of the line current is used to derive there from a correction current Icorr for points on the load line wherein Vthr1 (see FIGS. 1 and 6) is being exceeded. Again the correction current is used to shift to load line (2) by increasing the line voltage Vline. FIG. 5 is only meant to schematically show a way whereon Icorr can be generated. The voltage across Rs is lead to a difference amplifier 12. After filtering the AC component by capacitor C2 the voltage part exceeding Vthr1 is converted into a current by circuit 13 and fet to a current mirror T10, T11 to generate Icorr. As described earlier Icorr will lead to load points on lifted load lines (2,3).

Of course the mechanisms describes above can be used to introduce to three or more tilting points as indicated in FIG. 6.

Figure 7:
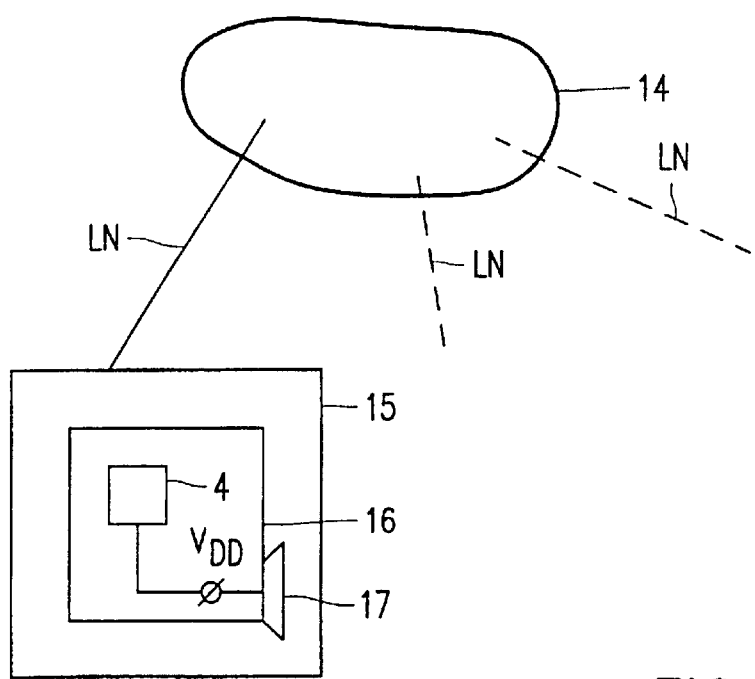
FIG. 7 schematically shows a telecommunication device provided with a power supply circuit according to the present invention.

FIG. 7 schematically shows a network 14 with several lines LN connected thereto. A telecommunication device 15 is connected to such a line LN. The device 15 comprises a telephone 16 having facilities 17 connected to the power supply circuit 4 through terminal VDD.

What is claimed is:

1. A power supply circuit comprising:
   a line voltage forming circuit for forming a first voltage that is proportional to a line voltage provided by a telecommunication line;
   a supply voltage forming circuit for forming a second voltage from said first voltage, said second voltage being proportional to said first voltage;
   a sensing circuit for sensing said telecommunication line and for providing a sensor signal that is representative of power provided by said telecommunication line, said line voltage forming circuit being controlled by said sensor signal such that a slope of a load line characteristic of said line voltage forming circuit is modified when said sensor signal is above a predetermined threshold signal, said load line characteristic defining an increase of said line voltage with an increase of a line current provided by said telecommunication line;
   wherein said sensing circuit comprises a current sensor, and a current comparator coupled to said current sensor, said predetermined threshold signal being a current threshold signal that is provided to said current comparator, and said current comparator providing said sensor signal; and
   wherein a further current threshold signal is provided to said current comparator, said further current threshold signal controlling further modification of said slope when said sensor signal is above said further current threshold signal, said further current threshold signal being above said current threshold signal.

2. A power supply circuit comprising:
   a line voltage forming circuit for forming a first voltage that is proportional to a line voltage provided by a telecommunication line;
   a supply voltage forming circuit for forming a second voltage from said first voltage, said second voltage being proportional to said first voltage; and
   a sensing circuit for sensing said telecommunication line and for providing a sensor signal that is representative of power provided by said telecommunication line, said line voltage forming circuit being controlled by said sensor signal such that a slope of a load line characteristic of said line voltage forming circuit is modified when said sensor signal is above a predetermined threshold signal, said load line characteristic defining an increase of said line voltage with an increase of a line current provided by said telecommunication line;
   wherein said sensing circuit comprises a voltage comparator, said predetermined threshold signal being a voltage threshold signal that is provided to said voltage comparator, said voltage comparator providing said sensor signal.

3. A power supply circuit as claimed in claim 2, wherein said sensing circuit comprises a voltage source that provides said voltage threshold signal.

4. A power supply circuit as claimed in claim 2, wherein a further voltage threshold signal is provided to said voltage comparator, said further voltage threshold signal controlling further modification of said slope when said sensor signal is above said further threshold signal, said further voltage threshold signal being above said voltage threshold signal.

5. A method for deriving a supply voltage from a line that provides a line voltage, said method comprising:
   forming a first voltage that is proportional to said line voltage;
   deriving said supply voltage from said voltage, said supply voltage being proportional to said first voltage;
   sensing said telecommunication line, thereby providing a sensor signal that is representative of power provided by said line; and using said sensor signal to control said forming of said first voltage such that a slope of a load line characteristic is modified when said sensor signal is above a predetermined threshold signal, said load line characteristic defining an increase of said line voltage with an increase of a line current provided by said line; and further modifying said slope when said sensor signal is above a further predetermined threshold signal, said further predetermined threshold signal being above said predetermined threshold signal.

6. A power supply circuit comprising:

a line voltage forming circuit for forming a first voltage that is proportional to a line voltage provided by a telecommunication line;

a supply voltage forming circuit for forming a second voltage from the first voltage, the second voltage being proportional to the first voltage; and a sensing circuit for sensing the line current provided by the telecommunication line, the line voltage forming circuit being controlled by a sensor signal provided by the sensing circuit such that a slope of a load line characteristic of the line voltage forming circuit is modifiable when the line current is above a first current threshold and wherein the slope of the load line characteristic of the line voltage forming circuit is further modifiable when the line current is above a second current threshold, wherein the second current threshold is above the first current threshold;

wherein the load line characteristic defines an increase of the line voltage with an increase of the line current provided by the telecommunication line.

* * * * *